United States Patent [19]

Narita et al.

[11] 4,309,172
[45] Jan. 5, 1982

[54] SHIP WITH IMPROVED STERN STRUCTURE

[75] Inventors: Hitoshi Narita, Musashino; Yoshikuni Kunitake, Yachiyo; Hikaru Yagi, Wakabayashi, all of Japan

[73] Assignee: Mitsui Engineering & Shipbuilding Co., Ltd., Tokyo, Japan

[21] Appl. No.: 56,145

[22] Filed: Jul. 9, 1979

Related U.S. Application Data

[63] Continuation of Ser. No. 846,830, Oct. 31, 1977, abandoned, which is a continuation of Ser. No. 713,620, Aug. 11, 1976, abandoned.

[30] Foreign Application Priority Data

Aug. 14, 1975 [JP] Japan .................................. 50-98954

[51] Int. Cl.³ .............................................. B63H 5/14
[52] U.S. Cl. ..................................................... 440/67
[58] Field of Search ..................... 114/151; 415/126; 440/66, 67

[56] References Cited

U.S. PATENT DOCUMENTS

| | | | |
|---|---|---|---|
| 3,066,893 | 12/1962 | Mercier | 115/42 X |
| 3,179,081 | 4/1965 | Backhaus et al. | 115/42 |
| 3,605,672 | 9/1971 | Strumbos | 115/42 |
| 3,635,186 | 1/1972 | German | 115/42 |

FOREIGN PATENT DOCUMENTS

| | | | |
|---|---|---|---|
| 490526 | 1/1930 | Fed. Rep. of Germany | 115/42 |
| 651579 | 2/1934 | Fed. Rep. of Germany | 115/42 |
| 160588 | 11/1941 | Fed. Rep. of Germany | 115/42 |
| 722842 | 11/1942 | Fed. Rep. of Germany | 115/42 |
| 1181090 | 1/1962 | Fed. Rep. of Germany | 115/42 |
| 894007 | 12/1944 | France | 115/42 |
| 1397310 | 3/1965 | France | 115/42 |
| 378542 | 2/1940 | Italy | 115/42 |
| 401425 | 11/1933 | United Kingdom | 115/42 |

*Primary Examiner*—Sherman D. Basinger
*Attorney, Agent, or Firm*—Armstrong, Nikaido, Marmelstein & Kubovcik

[57] ABSTRACT

The present invention relates to a ship with structural improvements which prevent factors causing an increase in the horsepower required for propulsion or an increase in propeller cavitation, hull vibration and noise, all of which result from the water turbulence and nonuniformity of flow field along the stern caused by corpulence of ship, and the present invention provides such a ship with a structural improvement comprising having a ring-shaped construction directly attached to the hull on each of the ship's stern and in front of the propeller.

13 Claims, 28 Drawing Figures

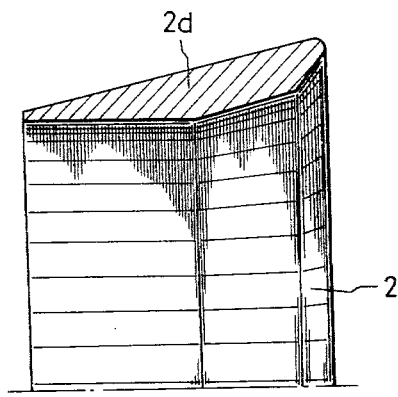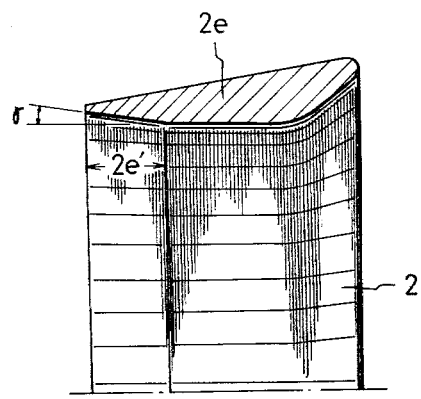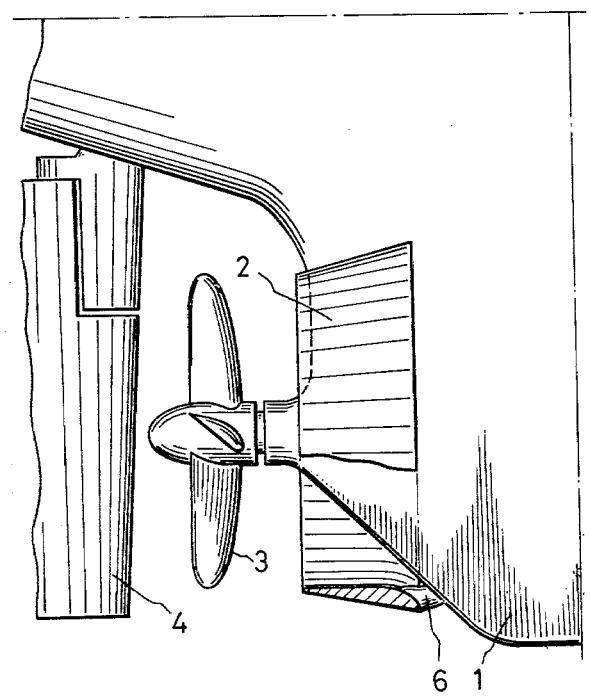

−0.1 FRACTION OF THE VELOCITY
BASE LINE

MODEL WAKE DISTRIBUTION

SHIP WITH IMPROVED STERN STRUCTURE

This application is a continuation of application Ser. No. 846,830, filed Oct. 31, 1977, now abandoned which is a continuation of application Ser. No. 713,620, filed Aug. 11, 1976, now abandoned.

BACKGROUND OF THE INVENTION

In recent years attempts have been made to lower the building cost of ships by making hulls in a form as full as possible in relation in a required deadweight all as part of an improving approach to the ship's economy of structure and operation.

However, as the hull increases in fullness, the flow turbulence and the nonuniformity of flow field around the stern also increases, as a consequences an increase in horsepower is required due to the increase in resistance and there is thus a decrease in propulsive efficiency, an increase in propeller cavitation, vibration and/or noise level, which may offset any economic benefit attained by lowering the building costs. Accordingly, there has been need to remedy the lowering of ship's performance due to corpulence of hull form, while maintaining the initial building cost at a lower level.

Among the devices which have heretofore been applied with an intent to improve the performance of ships are, (A) ducted propeller (or so-called nozzle propeller) and (B) stern fin.

(A) The ducted propeller, in which a duct is provided around the propeller as shown in FIG. 16, exerts thrust not only by the propeller but also by the duct as the result of hydrodynamic interaction between the propeller and duct, and thereby improves propulsive efficiency.

This ducted propeller utilizes hydrodynamic interaction between the propeller and the duct, and therefore it is necessary to optimize the ducted propeller as an integral propulsor including the propeller and duct. Accordingly, conventional propellers without the duct can not be used as impellers for ducted propellers and, instead, a specially designed propeller is required which has a diameter and pitch different from the conventional propeller. Based upon previous studies about ducted propellers, it is known that the appropriate length of the duct is about 50% of the diameter of the propeller and that the appropriate position of the propeller is about the mid-position of the duct length. It is also known that the narrower the clearance between the propeller tip and the duct inner surface, the higher the propulsive efficiency will be.

As described above, by adopting the ducted propeller, it is possible to increase the propulsive efficiency and decrease the required horsepower of a ship with a heavily loaded propeller. However, in order to maximize the propulsive efficiency of the ducted propeller, the clearance between the inner surface of the duct and the propeller tip must be minimized, and under such a condition cavitation erosion is liable to occur on the inner surface of the duct due to the cavitation generated near the tip portion of the propeller on the blade surface thereof resulting in damage to the duct.

Moreover, if the duct is located too close to the ship hull, an increase of resistance (increase of thrust reduction fraction) and a drop of propulsive efficiency will be caused due to the acceleration effect of the flow around the ship hull owing to the duct. Accordingly, it is necessary that the leading edge of the duct be properly located away from the ship hull (the stern frame). Also, in the ducted propeller design, in order to prevent the duct erosion a shortened duct which is situated just in front of the propeller and aft of the stern frame is also considered, but in this case dramatic improvement of propulsive performance cannot be expected.

As described above, the ducted propeller requires a high degree of accurate in construction and is also subject to damage by cavitation erosion, and in order to avoid this, the propeller tip and the inner surface of the duct are designed so as to be sufficiently separated from one another, the propulsive efficiency is inevitably reduced below that of conventional propellers.

In the case where the ducted propeller is intended to be applied on an existing ship, if the existing propeller is utilized, the revolution speed of the propeller becomes too high or the main engine output corresponding to the rated revolution speed becomes too small, which inevitably necessitates replacement of the existing propeller by a new one, thus sacrificing the economy achieved.

(B) The stern fins are, as shown in FIG. 17, appendages from the ship hull mounted at the upper portion of the stern portion of the hull in front of the propeller. The stern fins are effective to reduce hull vibration and noise by suppressing the unstable flow around the stern, particularly in the area of the cruiser stern portion. However, the effective power savings is minimal and the so-called tip vortex is produced from the edge of fin, thus resulting in an increase of resistance in many cases. Moreover, this tip vortex sometimes causes cavitation which flows down to the propeller located aftward, resulting in damage to the propeller and an increase in hull vibration. Further, the stern fins are of cantilever construction and, therefore, a substantial reinforcement of the ship hull is necessary for supporting the fins. Because of these difficulties, the stern fins can not be used effectively.

SUMMARY OF THE INVENTION

The present invention is characterized in that, in order to overcome the above drawbacks of the prior art in ships, a construction for directly controlling the flow is mounted at the stern portion of ship for attaining improvement in performance by utilizing the hydrodynamic characteristics of flow field around the ship's stern and the effect of interaction between the hull and the propeller.

The present invention improves the propulsive performance of a ship having a full hull form, as will be apparent from the reasons hereinafter described, and to this end provides concretely the following means, namely (1) means for suppressing disturbance of the flow field around the stern, and equalizing said flow field, (2) means for allowing effective use of the stern flow field by guiding the wake properly into the propeller operating plane, (3) means which can provide a thrust, (4) means which does not require such construction accuracy as required by the ducted propeller, does not suffer from any erosion as observed with the ducted propeller, does not require any special construction such as the stern fins, and can prevent various drawbacks due to the tip vortex and cavitation caused thereby and, (5) means which is easily applicable to existing ships.

Hereinafter the necessity of the above means (1)–(5) will be explained.

(A) Relating to the factors effecting the required power of a ship:

When a ship is operated at a speed of Vs against the ship resistance of Rs, the necessary delivered horsepower (DHP) from the main engine is expressed by the following:

$$DHP \propto RsVs/\eta$$

wherein $\eta$ is propulsive efficiency, and this is expressed as the following:

$$\eta = \frac{1-t}{1-w} \cdot \eta_0 \cdot \eta_R$$

wherein $(1-t)/(1-w)$ is an element representing the interaction between the propeller and the hull, t is a thrust reduction fraction, w is a wake fraction, $\eta_o$ is the so-called open efficiency of a propeller without a hull in front thereof, and $\eta_R$ is the relative rotative efficiency and represents a ratio of propeller efficiency in the so-called "behind condition" where the propeller operates in the disturbed flow behind the hull to $\eta_o$.

Accordingly, it is apparent from the foregoing discussions that in order to decrease the required horsepower for the same speed as a performance improvement, it is necessary to realize a decrease in the resistance and an increase in the propulsive efficiency.

(B) Relating to ship hull resistance:

The hull resistance can be generally divided into friction resistance of equivalent flat plate, form resistance and wave-making resistance according to the so-called 3-dimensional analysis. The form resistance of these three constituents is composed of viscous pressure resistance and induced drag, which are largely affected by the hull form in the stern portion and the condition of the flow field resulting therefrom. Particularly as the hull form becomes full, the flow around the stern is disturbed in a greater degree because of generation of the 3-dimensional separation vortices, etc. and thereby the form resistance is increased. Accordingly, the resistance can be reduced by suppressing the disturbance of flow around the stern and making the unevenness of flow field small.

(C) Relating to propulsive efficiency:

In order to raise the propulsive efficiency, the following factors should be considered. The thrust reduction fraction t represents mainly the portion of increase of the hull resistance (in other words the portion of increase of the required thrust of the propeller) due to operation of the propeller behind the ship, and in the case of sailing at a constant speed, the increase of the required thrust in the propeller represents the decrease in propulsive efficiency. Accordingly, if a means is provided which can produce an additional thrust, without a increase in horsepower other than a propeller like the ducted propeller, the propulsive efficiency will be increased.

The wake fraction w is generally expressed in the form of $1-w$, and this $(1-w)$ is defined by the ratio Vx/Vs, where Vx is the average water velocity flowing into the propeller and Vs is the ship velocity. Accordingly, $(1-w)$ is held to a minimum by concentrating as slow a flow as possible within the propeller operating plane (a circle having a diameter corresponding to that of the propeller), namely by covering this plane with a high wake, so that the propulsive efficiency can be raised in the form of energy recovery at the propeller. Also, in order to raise $\eta_R$, it is necessary to reduce the disturbance of flow into the propeller and to homogenize the flow field around the stern.

On the other hand, the unevenness of the flow field at the stern increases the variations in time and position with respect to the produced thrust and torque of the propeller operating in the flow field, and causes an increase in the propeller cavitation and increases of the hull vibration and noise resulting from an increase in the exciting forces, and therefore the equalization of the stern flow field is effective to remove the causes of these performance obstructions.

As stated above, the performance of a ship becomes gradually inferior as the hull form becomes fuller, and the present invention provides structure which suppresses the disturbance of the flow field around the ship stern, equalizes the flow field as much as possible, utilizes the flow field of the ship stern effectively by guiding the wake, particularly the slow flow, into the plane of propeller as evenly as possible all over this plane, and provides an additional thrust.

In order to attain the above object, the present invention relates to a ship in which a ring-shaped construction is directly connected to the hull on each side of the ship's stern and a propeller is arranged behind said construction.

BRIEF DESCRIPTION OF THE DRAWINGS

FIG. 1 is a side view of the stern portion of a ship showing a ring-shaped construction mounted at the stern portion in section and FIG. 2 is a sectional view as seen in the direction of the arrow A—A of FIG. 1;

FIG. 3 is a sectional view taken on the line B—B of FIG. 2;

FIG. 4 is a sectional view taken on the line A'—A' of FIG. 1;

FIGS. 10 and 11 are views respectively showing sectional shapes of ring-shaped constructions;

FIG. 12 is a side view showing the condition in which the upper portion of the ring-shaped construction is directly attached to the ship and the lower portion thereof is attached to the ship through a support member;

| 1  | Ship hull,               | 2 | Ring-shaped construction, |
|----|--------------------------|---|---------------------------|
| 1a | Cruiser stern,           | 3 | Propeller,                |
| 4  | Rudder,                  | 5 | Supporting structure,     |
| 6  | Supporting structure,    | 7 | Duct,                     |
| 8  | Supporting structure,    | 9 | Stern fin,                |
| 10 | Ring-shaped construction |   |                           |

DETAILED EXPLANATION OF INVENTION

The present invention is characterized in that a ring-shaped construction is directly fixed to the hull at the stern portion of a ship and adapted to guide the wake into the rotating disc area of the propeller, thereby controlling the flow to the propeller, and the details thereof will be described further by way of examples with reference to the accompanying drawings.

Figure 1:
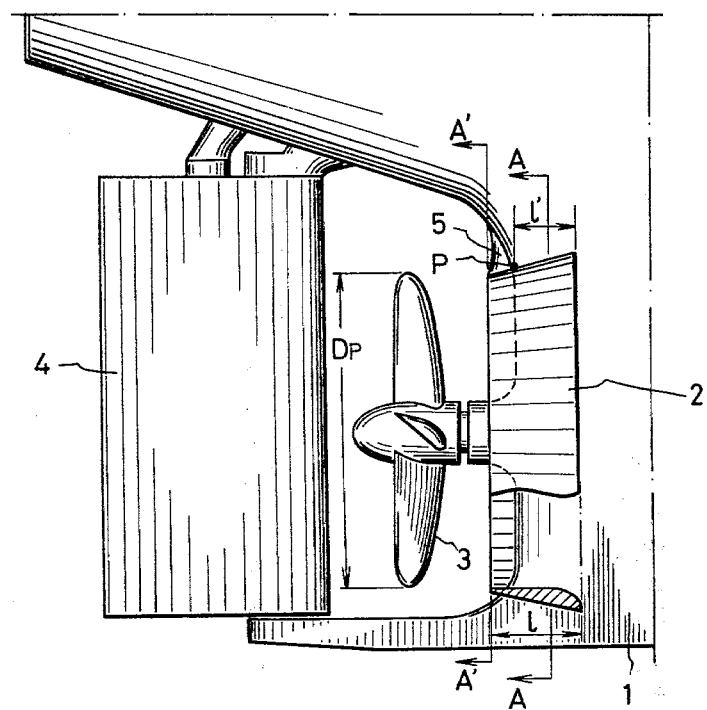
FIGS. 1 to 4 show a first embodiment of the present invention.
Figure 2:
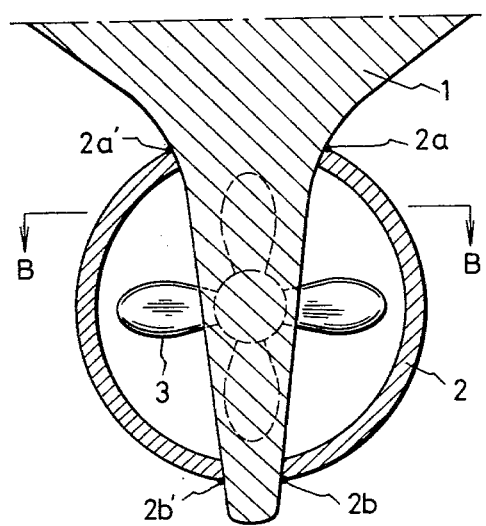

FIG. 1 shows a preferable embodiment of the present invention, which is provided with a ring-shaped construction 2 attached to the hull 1, at the stern of a ship. This ring-shaped construction 2 is overlapped with the hull wholly or in part when viewed from the side. The overlapped portion with the hull 1 of the ring-shaped construction 2 is directly joined to the hull 1 by joint portions 2a, 2b, 2a' and 2b' as shown in FIG. 2. The portion of the ring-shaped construction not overlapping; with the hull 1 is connected by means of a support member 5 as desired, as shown in FIG. 1. Behind the ring-shaped construction 2 a propeller 3 of a diameter of $D_p$ is mounted, and behind it a rudder 4 is mounted. As is evident from FIG. 1, viewed from the side, the ring-shaped construction 2 is directly supported by the hull 1 and a propeller 3 is mounted at a position separated a little aft from the rear end of said construction 2. The ring-shaped construction may be composed of a complete continuous ring-shaped or halves of a ring and the like. Such constitutions of the construction 2 are properly selected in accordance with the relation to the shape of ship to which it is attached.

Figure 18:
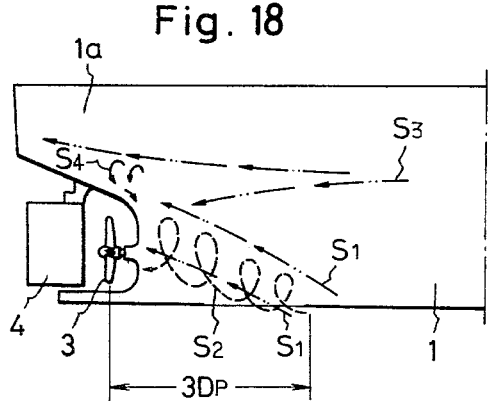
FIGS. 18 and 19 are explanatory views respectively showing a condition of flow at the stern portion of a ship without and with a ring-shaped construction according to the invention.

As already explained, in the full ship, in order to attain reduction in the resistance, an effective method is to reduce the form resistance. The form resistance is largely affected by the condition of the flow field particularly from the location of the propeller to a point at about 10% of the length of ship forward. The condition of the flow field at the stern portion is such that, as shown in FIG. 18, there is, on one side, a flow $S_1$ rolled up from the bottom of hull, and this is accompanied by 3-dimensional separation vortices $S_2$ in the instance of a full ship. The flow $S_3$, having come along the side, changes in accordance with the hull shape near the stern and in the vicinity of the stern portion the disturbance becomes large due to the complex intermixture of the flows $S_1$ and $S_3$. Since the hull shape is abruptly changed in the vicinity of the cruiser stern is at the upper portion of the propeller 3, a large separated flow $S_4$ is sometimes produced. As noted above, the flow at the stern is largely disturbed, and the energy lost by this disturbance of the flow becomes a resistance (the form resistance). This disturbance of the stern flow field is, as shown in FIG. 18, remarkable particularly within the area ranging from the propeller 3 forward to a point having a distance therefrom of about 3 times the diameter $D_p$ of the propeller 3.

Figure 19:
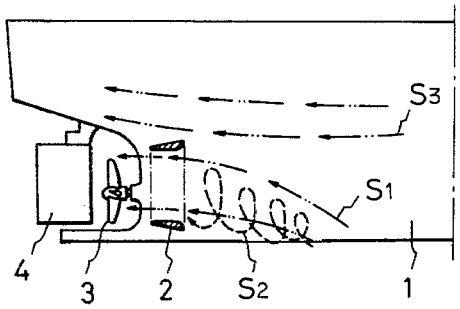

The present invention has been achieved by paying attention to said flow of the stern portion, and the principle thereof is as shown in FIG. 19.

As shown in the drawing, where a ring-shaped construction 2 is mounted so that the leading edge thereof lies within the range of said disturbance of the flow field, the flow $S_1$ accompanied by the 3-dimensional separation vortices $S_2$ directed upward and forward of the ring-shaped construction 2 can be rectified and equalized into the parallel flow. Moreover, the flow $S_3$ above the ring-shaped construction 2 is distinguished from the flow rolled up from below, so that the disturbance can be suppressed. After all, this ring-shaped construction 2 reduces the hull resistance and serves as a rectifying vane for the flow directed into the propeller and supplies the flow which allows the propeller 3 to produce a sufficient thrust.

Next, the flow field around the ship hull at the stern is divided into two flow parts, with one being a flow part which is subjected to an influence from the hull (this part is called the wake and becomes a slower flow than the ship speed, and on the hull surface the flow velocity becomes zero, namely the wake fraction $w=1$.) and the other being a flow part which is not subjected to an influence from the hull and has a velocity corresponding to the ship speed (the wake fraction $w=0$). When the propeller is not in operation, the slower flow part (the wake) flows backwardly of the hull thereby resulting in an energy loss (namely a resistance), but when the propeller is in operation, it results in an increase of the propulsive efficiency at the same ship speed. This is called the wake gain.

In order to make this wake gain more effective, it is necessary to guide the slower flow only into the operative plane of the propeller (within a circle having a diameter of the propeller) and to make the flow flowing into the propeller operative plane even slower. Accordingly, the ring-shaped construction for attaining the concentration of such a wake and the effective utilization of the flow field is required to surround the propeller operative plane in front of the propeller, and therefore to this end such a shape as the stern fin is unsuitable and it must have a ring shape.

Figure 20:
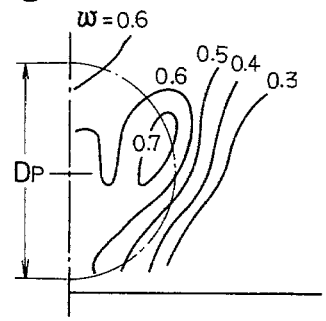
FIG. 20 is a view showing a distribution of flow velocity flowing into the propeller of the ship shown in FIG. 18.

FIG. 20 shows an example of the wake pattern of a full ship, and the slow flow, namely a flow of w=1 or a value close to this is not covering to a great extent the area within the propeller operative plane.

Figure 21:
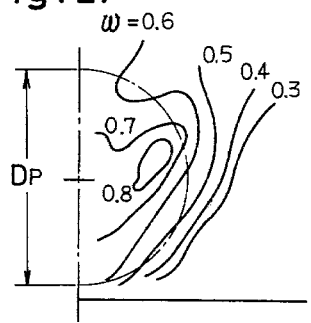
FIG. 21 is a view showing a distribution of flow velocity flowing into the propeller of the ship shown in FIG. 19.

FIG. 21 shows the wake pattern of the case in which, as shown in FIG. 1 or FIG. 19, the ring-shaped construction is provided at the ship stern, and this shows a state of broad coverage of the propeller operative plane by the slow flow of w=0.8, 0.7 or 0.6.

Figure 22:
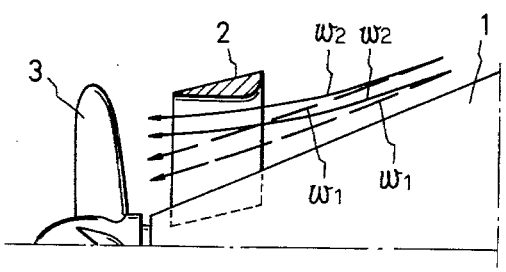
FIG. 22 is a plan view showing the stern flow condition of the ship.

FIG. 22 shows the flow at the stern according to the present invention in a manner for easy understanding and also shows the state wherein the flow $w_1$ without the ring-shaped construction shown in FIG. 20 is spread by this construction as indicated by $w_2$, and also shows the state wherein the slow flow is supplied within the operative plane of the propeller 3, resulting in the wake pattern shown in FIG. 21.

Figure 23:
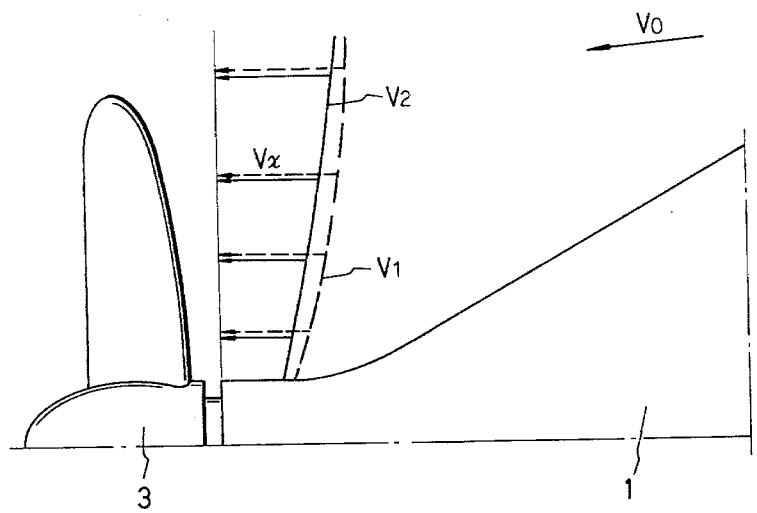
FIG. 23 is a plan view showing a distribution of axial flow velocity at the shaft center level flowing into the propeller of a ship with and without the device according to the invention.

FIG. 23 shows a distribution of the axial flow velocity at the shaft center level, which indicates that the velocity $V_1$ without the ring-shaped construction is larger than the velocity $V_2$ with the construction of this invention.

Relating to the attaching position of the ring-shaped construction, in the instance where the ring-shaped construction is located too far forward with respect to the position of the propeller 3, and in the instance where said construction is separated forward more than 3 times the propeller diameter $D_p$ from the position of the propeller 3, the boundary layer at that position is so thin (the thickness of the slow flow part flowing along the hull is thin.), that the effective utilization of the wake is hardly realized, and in the instance where the leading edge of the ring-shaped construction is too close to the propeller and is located aft to a point beyond the stern frame, the wake has already been diffused ahead of the construction, so that the effective guiding of the wake into the operative plane of the propeller 3 becomes difficult.

Moreover, if the length l of the ring-shaped construction 2 (see FIG. 1) is too short, there is no suppression of the disturbance of the stern flow field and the guiding of the flow, and on the contrary, if it is too long, the resistance of this appendage itself becomes large and a detrimental factor. When taking these various facts into consideration, the length l of the ring-shaped construction 2 is effective when ranging from about 20% to about 100% of the propeller dismeter.

At the portion where the upper end face of the ring-shaped construction 2 is directly joined to the hull, the distance from the rearmost joining point (in FIG. 1, the intersecting point P of the upper end face of the ring-shaped construction 2 with the stern frame) to the foremost end of the ring-shaped construction 2, namely the length l' of the portion over which it is directly joined to the hull has to be more than 20% of the length l of the ring-shaped construction 2 in order to attain suppression and equalization of the disturbance and an effective utilization of the wake as described above.

Figure 4:
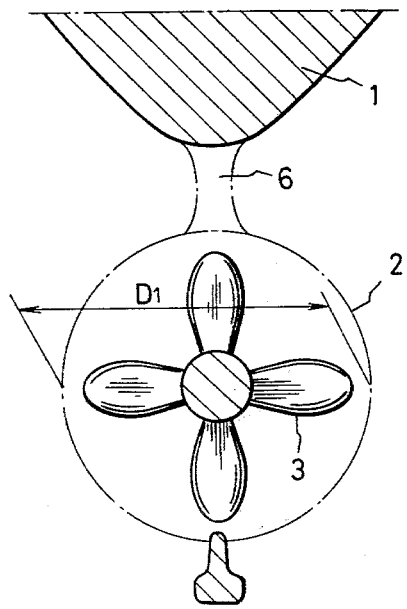

There is an intimate relation between the inner diameter of the ring-shaped construction 2 and the propeller diameter $D_p$. Namely, as shown in FIG. 4, in the inner face of the trailing edge of the ring-shaped construction 2 at the height of the propeller shaft, its diameter (horizontal length) $D_1$ is about 60% to about 150% of the propeller diameter $D_p$. When $D_1$ is too large, the slow flow guided toward the propeller 3 by means of the ring-shaped construction 2 can not be effectively directed into the propeller's operative plane, resulting in a large loss of energy, and, on the contrary, when $D_1$ is too small, the rate at which the relatively fast flow outside the ring-shaped construction gets into the operative plane of the propeller 3 is excessive, thereby reducing the propulsive efficiency, and accordingly it is necessary to determine the diameter $D_1$ of the ring-shaped construction based upon a consideration of the example's of experimental comparison, etc. shown in FIGS. 20 and 21.

In the present invention, the crosssectional shape of the ring-shaped construction 2 is also important. In the instance where the prior art stern fins have been analyzed, the wing section has been used for reducing its resistance as much as possible. The sectional shape of the present inventional ring-shaped construction also resembles a wing. However, since it is necessary to widen and spread outward the slow flow near the stern hull and supply this slow flow equally within the operative plane of the propeller, the crosssectional shape of the present invention differs from that of said prior art stern fins.

Figure 3:
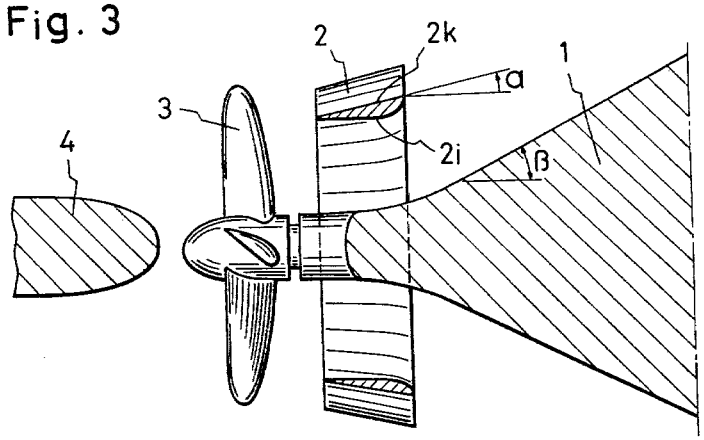

Namely, it is necessary that the crosssection of the ring-shaped construction of the present invention have, as shown in FIGS. 1 and 3, the convex face 21 inside with the outer peripheral face being flat.

Also, when an angle $\alpha$, enclosed between the flat face $2k$ of the section shape of the ring-shaped construction 2 and the center line of the hull (positive direction is outward from the center line of the hull.) is too large, the effect in spreading the slow flow near the stern outward such as shown in FIG. 22 becomes minimal, and too large an angle is made in relation to the flow rolled up from the bottom of hull, resulting in an increase in resistance. When the angle $\alpha$ is inclined inward at an excessive degree with respect to the hull centerline, likewise, the construction results in increasing the resistance due to its flow resisting angle. The suitable angle of $\alpha$ ranges approximately from $-10$ degrees to 30 degrees, as a result of the experiment.

According to the present invention, the flow at the stern is forcibly spread outward in the propeller's operative plane as shown in FIG. 22, and the flow velocity distribution of the present invention at the operating plane of the propeller 3 is generally slow compared with the flow velocity when having no ring-shaped construction.

Figure 24:
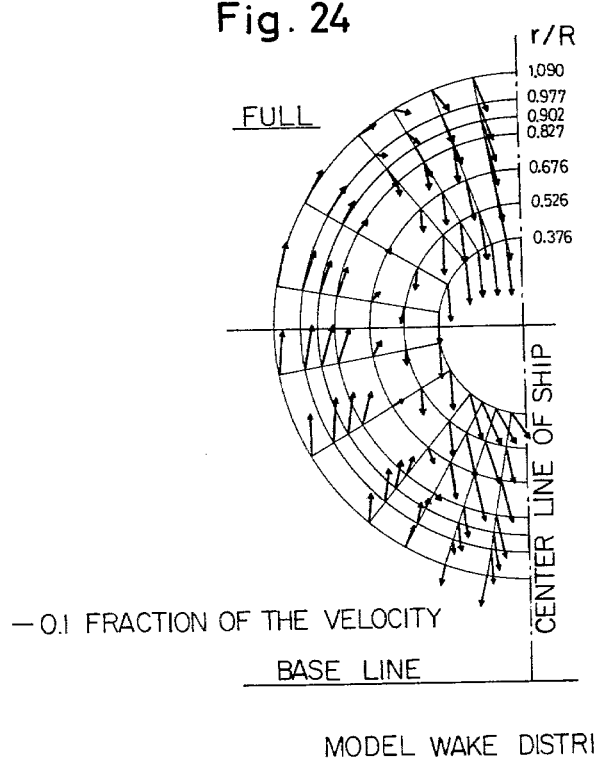
FIG. 24 is a view showing the distribution of the velocity component in the propeller operating plane of the flow incoming to the propeller.

Further, the flow around the stern has both radial and circumferential components as indicated in FIG. 24, and therefore, the ring-shaped construction placed in this oblique flow exerts thrust due to its aerofoil type crosssection, resulting in an increase of propulsive efficiency.

The important point of the present invention is that a ring-shaped construction is directly attached to the ship stern, whereby the slow flow along the hull is directed within the propeller operative plane to allow the slow flow cover this plane as an equalized high wake, and the effects obtained by the present invention are as follows:

(1) The ring-shaped construction produces a reduction in hull resistance and an increase of propulsive efficiency, since this construction acts as a kind of flow regulator or ring-shaped partition, thereby suppressing the turbulence of the stern flow, homogenizing the flow and making it possible to utilize effectively the stern flow for energy recovery at the propeller, by guiding a high wake flow field into the propeller operative plane. Thus, this ring-shaped construction can reduce the required engine power for a given speed.

(2) Ununiformity of the stern flow field increases the thrust and torque variations in time and position of a propeller operated in said flow field, and causes an increase in the propeller cavitation and any increase of the exiting forces of the hull, which are accompanied by an increase in hull vibration and noise in the ship. Accordingly, the equalization of the flow field around the stern according to the present invention is effective also to remove these causes of performance obstructions.

(3) The ring-shaped construction of the present invention is mounted so as to be located, as viewed from the side, in front of the propeller apart therefrom, so that in the case of the present invention, damage of the inside face of the duct due to the propeller cavitation as caused in the ducted propeller does not occur.

(4) The ring-shaped construction of the present invention is directly fixed to the main hull, so that it can be of lighter construction than that fixed to the hull only by means of a ring supporting member extended from the hull, and since it has a ring-like shape, in the case of attachment to the hull, it does not require the reinforcement of the hull so much as the instances where a appendage of the centilever construction occurs such as with stern fins.

(5) The ring-shaped construction of the present invention can be easily attached to an existing ship as well as a new under construction ship, and even when applied to an existing ship, the present invention provides an economical means to improve the ship's performance, since this invention has unique characteristics to allow utilization of the existing propeller without replacement with a new one.

Further, the ring-shaped construction of the present invention can also be adopted with a particular intention to increase ship speed by properly adjusting the propeller revolution speed of an existing ship to a necessary level, were that propeller revolution speed has been lowered due to deterioration of the ship thus increasing a reduction of the rated power with attendant consequence of reduced ship speed, thus ultimately increasing the speed of such a ship.

(6) According to the present invention, the propulsive performance rises remarkably, and when propulsion tests in a towing tank was carried out with a ring-shaped construction as shown in FIGS. 1-3 attached to the stern of a 100,000 DWT type ship in front of the propeller, the effect of the present invention was confirmed.

Figure 25:
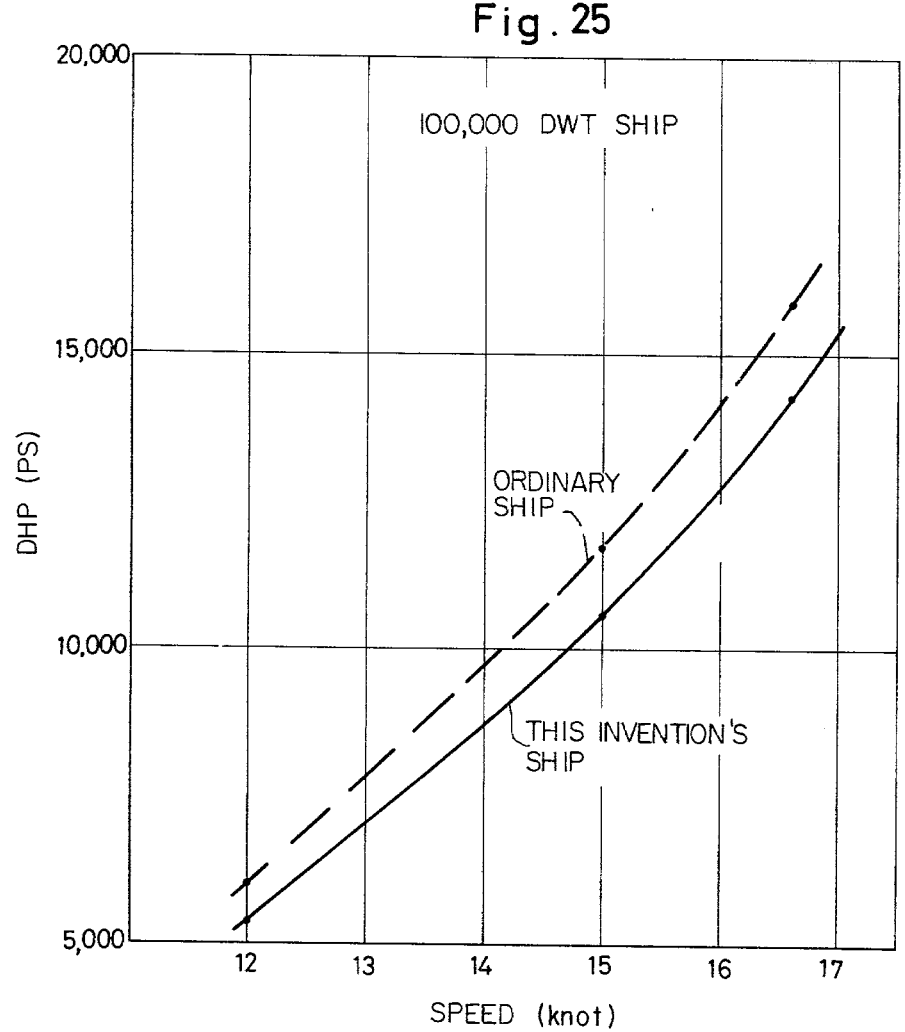
FIG. 25 shows the difference in the required power between a ship with a device according to the invention and a ship without it, taking a 100,000 DWT ship as an example.
Figure 26:
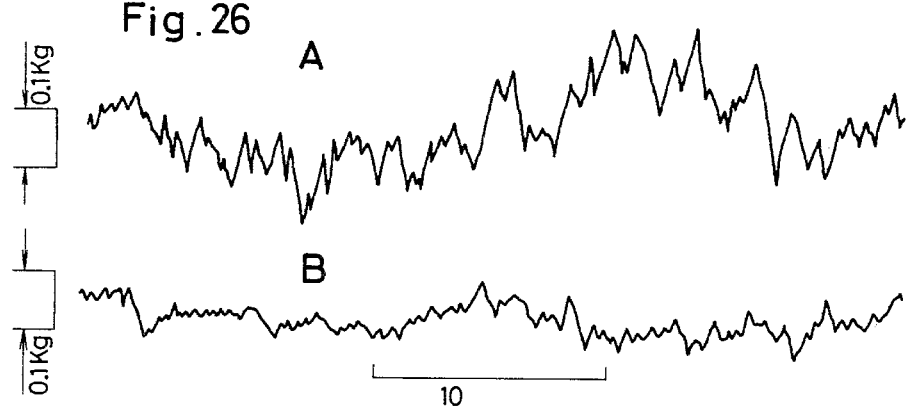
FIG. 26 is a view showing an example of record of thrust variation in a self-propulsion test.

FIG. 25 shows speed-power curves obtained by model tests, and in this example, a power saving of about 10% was obtained. FIG. 26 is an example of the records of the thrust variation in self-propulsion tests, wherein the upper curve A shows the condition of thrust variation of a conventional ship, and the lower curve B shows the condition of thrust variation of a ship according to the present invention, and it is evident that in the case of curve B, the amplitude of thrust variation is notably small compared with the case of curve A.

This shows that in the case of application of the present invention to an actual ship, the hull vibration and the noise inside the hull are reduced greatly.

(7) According to the present invention, the flow field of the ship stern becomes stabilized compared with the prior art ships, so that the maneuverability can be much improved also.

Hereinafter, other embodiments of the present invention will be explained.

Figure 5:
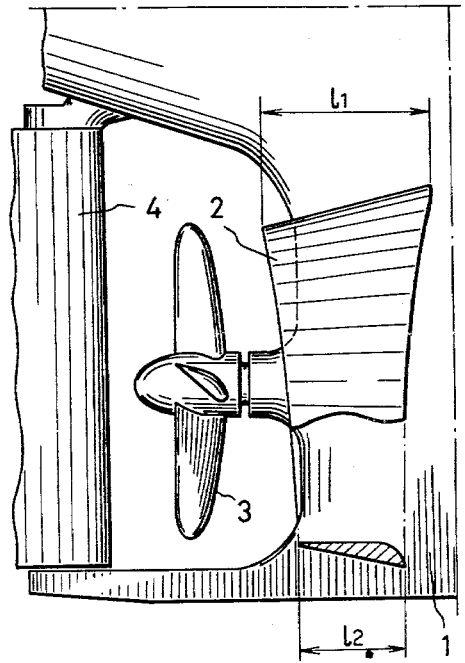
FIG. 5 is a sectional side view of the ship stern showing a ring-shaped construction in section which is broad at the upper portion and gradually made narrow toward the lower portion.

(1) FIG. 5 shows a ring-shaped construction 2, whose length is changed along its peripheral position, and the length (breadth) is $l_1$ at the upper attaching position to the hull, and this length is gradually reduced toward the lower attaching position, where the length is $l_2$.

A rate of change of length of the ring-shaped construction 2 is determined to be optimum in accordance with the condition of the flow field at the ship stern, and is required to be designed individually according to shape and size of the hull. In most cases where this configuration is adopted, the condition $l_1 > l_2$ is applied, however $l_1 > l_2$ may also be possible depending on hull shape.

Figure 6:
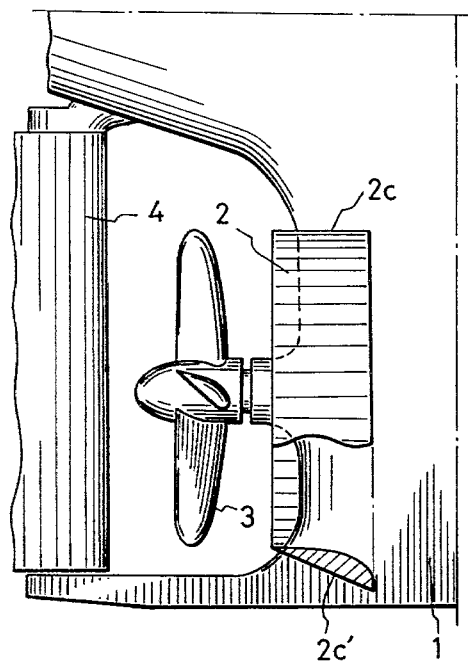
FIG. 6 is a sectional side view of the shape of the ship stern showing in section a ring-shaped construction which is horizontal at the upper portion, gradually directed outward toward the lower portion and directed downward at the attaching position of the lower portion.

(2) FIG. 6 shows that the inclination of the outside face of the wing section 2C of the ring-shaped construction 2 is not constant along its peripheral position, and can be changed to optimize the shape in accordance with strength of the bilge vortices and direction of the flow, and in the case of this embodiment, the wing section 2C' at the lower attaching position to the hull is directed downward in accordance with the flow direction.

Figure 7:
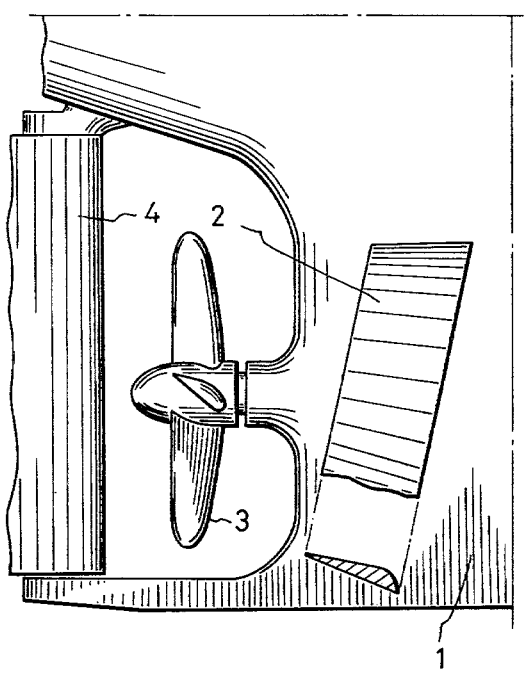
FIG. 7 is a sectional side view of the whole of a ring-shaped construction in the condition in which it is inclined downward forwardly and attached to the stern portion of the ship.

(3) FIG. 7 shows a ring-shaped construction 2 using a basic embodiment shown in FIGS. 1-3, which is wholly directed toward the side of the hull bottom is consideration of the direction of the flow rolled up from the hull bottom (see FIG. 18).

Figure 8:
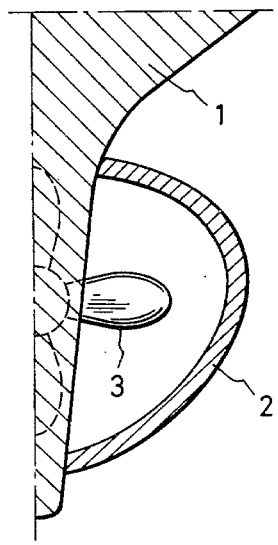
FIGS. 8 and 9 are views respectively showing the right halves of the ship sterns provided with ring-shaped constructions having shapes other than circular.

(4) A ring-shaped construction of the present invention is preferably a circular ring-shaped one as shown in FIG. 2 basically. However, it is necessary to provide various modified shape according to the hull form and condition of the flow field. FIG. 8 shows a configuration that has an upward bulge, and its bend becomes smaller toward the downward position, and thus it has the shape of an ellipse or resemblance thereto. This shape is suitable when the hull bottom is relatively pointed.

Figure 9:
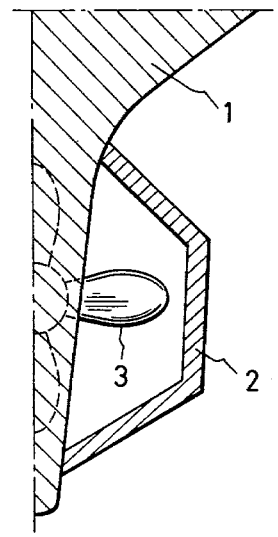

(5) The ring-shaped construction of circular or elliptical shape is generally difficult to produce, and, therefore, in such a case the construction made by a combination of straight lines as shown in FIG. 9 or that of straight lines and curves may be adopted.

(6) The section of the ring-shaped construction is preferably a stream lined wing section such as shown in FIGS. 1, 5 and 6. However, those that resemble a stream line can also be used. Comparing the wing section of complete stream line with another one composed of a combination of stream line and straight line, the latter is much easier than the former to produce. FIG. 10 shows the one which is designed mainly for easy production, and which is mostly formed by straight lines resembling a wing section.

(7) Considering the relative arrangement of the ring-shaped construction, the ship stern and the propeller and the diameter of propeller and so on, there are instances where the one having a section shape shown in FIG. 1 is not necessarily optimum. FIG. 11 shows the one which is designed particularly so as to increase the propulsive efficiency by spreading the slow flow all over the propeller's operative plane, and therefore has a diffuser angle $\gamma$ at the rear end portion 2e' of the section 2e, and its range is such that the angle $\gamma$ is 0°-10°, preferably 3°–5°, and thereby the propulsive efficiency can be increased further.

(8) FIG. 12 shows an embodiment wherein a ring-shaped construction 2 according to the present invention is mounted at the stern portion of the hull 1 having no sole-piece. In this figure, the lower end of the ring-shaped construction 2 is connected with the hull 1 by means of a support 6. Such an arrangement can be effectively utilized for ships, whose lower ends of the ring-shaped construction can not be fixed directly to the hull.

(9) The basic construction of the present invention lies in a ring-shaped construction directly attached to the ship stern in front of the propeller so that the attachment is by at least one end thereof. However, this construction may be adopted in combination with the prior art techniques.

Figure 13:
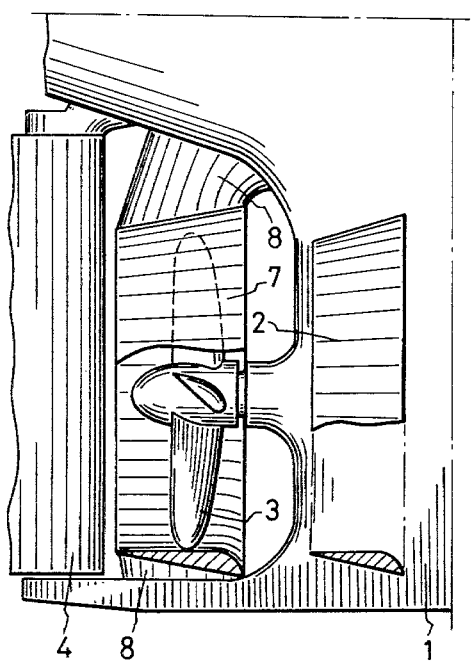
FIG. 13 is a partly broken side view showing an embodiment where the present invention is applied to a ship having a prior art ducted propeller.

FIG. 13 shows an embodiment wherein a ring-shaped construction 2 is mounted in front of a duct 7 attached to the stern of the hull 1 around the periphery of the propeller 3 by means of support members.

In this embodiment, the effects of the ring-shaped construction and the ducted propeller are multiplied, resulting in an increase in propulsive efficiency, and in addition, another effect can also be attained that the flow homogenized by the ring-shaped construction moderates the erosion of the inside face of the duct.

Figure 14:
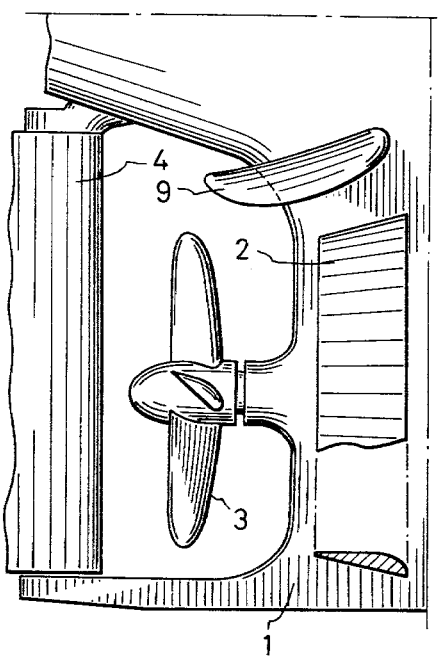
FIG. 14A is a partly broken side view showing an embodiment where the present invention is applied to a ship having the prior art stern fins.
FIG. 14B is a side view showing a ring-shaped construction the upper portion of which is extended toward the propeller.
FIG. 14C is a side view showing a ring-shaped construction, the upper portion of which is extended forward and backward along the flow.

(10) FIG. 14A shows a embodiment wherein the present invention is applied to a prior art ship having stern fins 9. In this embodiment, the flow at the upper portion of the stern is controlled by means of the stern fins 9, and the propulsive efficiency can be increased by guiding the slow flow along the hull 1 into the operative plane of the propeller 3 and spreading it therein.

Figure 14B:
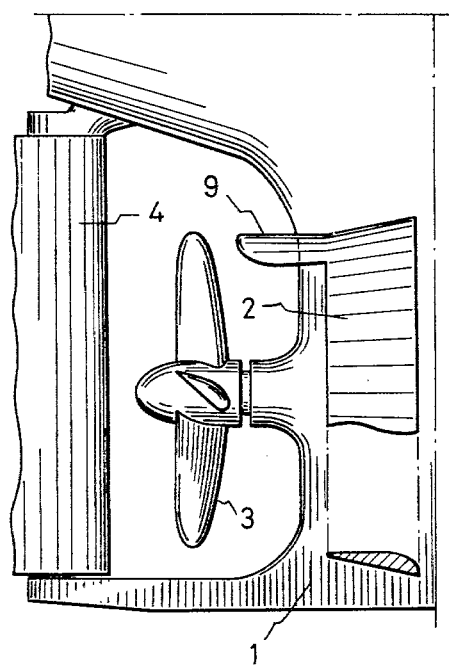
Figure 14C:
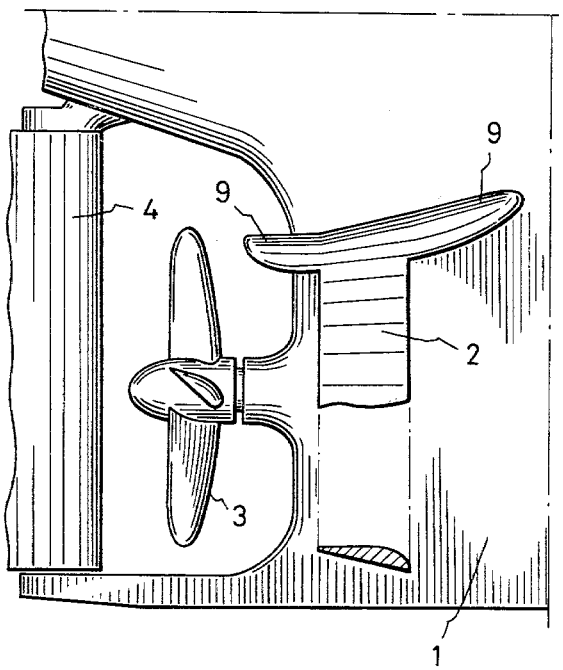

(11) FIG. 14B and FIG. 14C show other embodiments of the present invention wherein the stern fins 9 are connected so as to extend backward or both forward and backward in the vicinity of the upper half portion of the ring-shaped construction 2. In the case of the hull form particularly causing violent disturbance of flow field, it is possible to suppress the disturbance by overall lengthening of the ring-shaped construction 2. However, by the combination of the ring-shaped construction 2 and the stern fins 9 such as this embodiment, it is possible to obtain effects of equalization of the flow field and concentration of the wake, etc. by the ring-shaped construction 2 and in addition thereto a suppression of the disturbance without lengthening the ring-shaped construction, thereby increasing the propulsive efficiency. Moreover, the stern fin 9 is a cantilever construction when mounted independently without being combined with the ring-shaped construction, resulting in an increase in weight, while in the case of this embodiment the stern fins 9 are arranged so as to be connected with the ring-shaped construction 2, and accordingly the stern fins 9 can be made in a lighter weight construction.

(12) The embodiment of FIG. 14B is effective for the hull form which particularly causes violent disturbances of the flow field at the upper portion of the stern, and the embodiment of FIG. 14C is particularly effective for the hull form causing not only violent disturbance of the flow at the upper portion of the stern, but also violent disturbance of the flow at the forward upper portion of the ring-shaped construction and the flow rolled up from the hull bottom.

Figure 15:
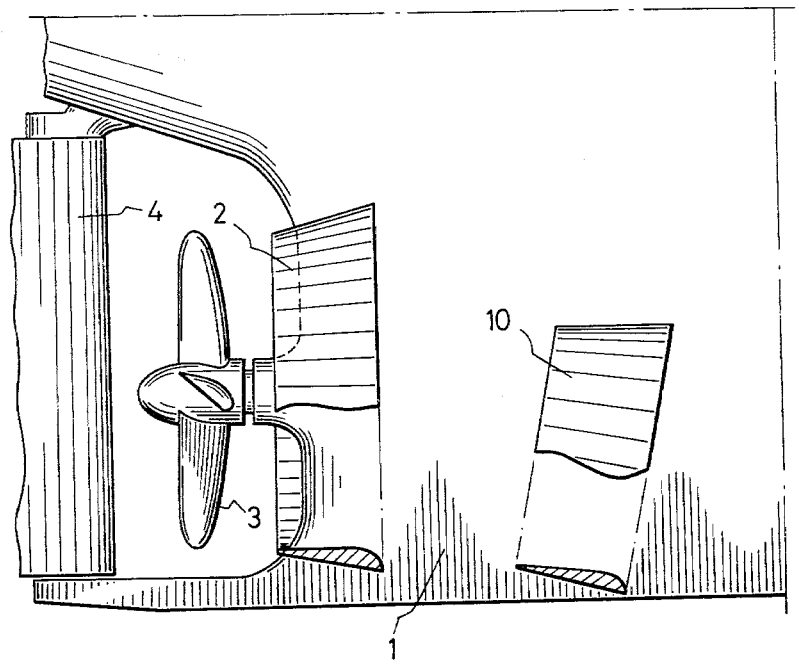
FIG. 15 is a side view showing a ring-shaped constructions arranged in two steps.
Figure 16:
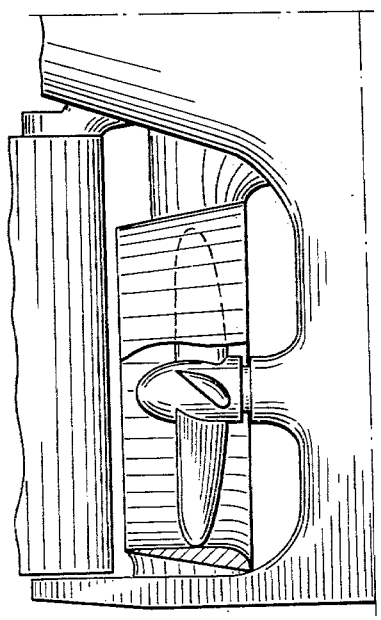
FIG. 16 is a side view of a prior art ducted propeller.
Figure 17:
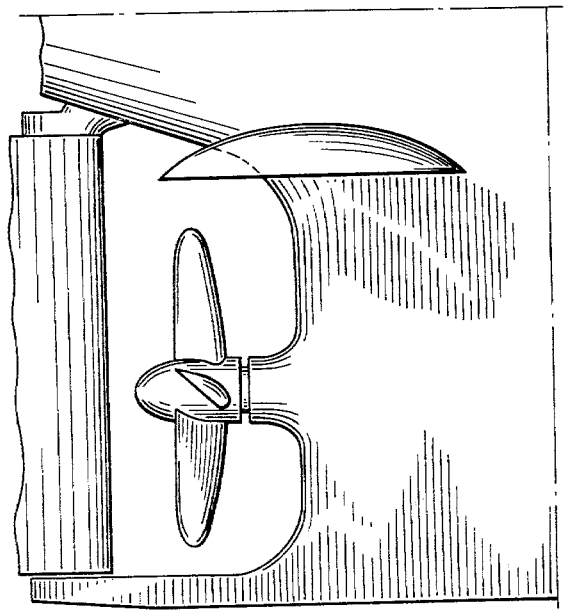
FIG. 17 is a side view of prior art stern fins.

(13) FIG. 15 shows an embodiment wherein a ring-shaped construction 2 of the present invention is mounted immediately in front of the propeller 3 and another small ring-shaped construction 10 is additionally mounted in front thereof.

According to this embodiment, the flow at the stern is controlled in two stages by means of two ring-shaped constructions 10 and 2, resulting in further improvement of the effect of the ring-shaped construction 2.

What is claimed is:

1. A ship comprising a main hull having a stern narrower at the bottom than at the top, a ring-shaped construction defining a continuous smooth-walled passage directly connected to the main hull on each side of the stern, thereby guiding a wake to a propeller, said propeller being mounted rearward of said construction, with a space between the rear portion of said construction and said propeller blades, said construction being directly connected in such a manner that, at the point of direction connection, at least 20% of its minimum longitudinal length is fixed to the stern of said hull such that a portion of the hull extends within said passage, said construction being within a range of:

$$l = 0.2\,D_P \text{ to } l = D_P$$

wherein $l$ is a longitudinal length of said construction and $D_P$ is a diameter of the propeller, said construction having an inner diameter which is between 60% and 150% of the diameter of the propeller, wherein said construction is longitudinally longer at the upper portion thereof than the lower portion, and a longitudinal cross-section of said construction is wing-shaped with an inner substantially convex surface, thereby increasing the width of the upper cross-sectional area from which water is drawn through said ring-shaped construction.

2. A ship comprising a main hull having a stern narrower at the bottom than at the top, a ring-shaped construction defining a passage directly connected to the main hull on each side of the stern, thereby guiding a wake to a propeller, said propeller being mounted rearward of said construction, with a space between the rear portion of said construction and said propeller blades, said construction being directly connected in such a manner that, at the point of direct connection, at least 20% of its minimum longitudinal length is fixed to the stern of said hull such that a portion of the hull extends within said passage, said construction being within a range of:

$$l = 0.2\,D_P \text{ to } l = D_P$$

wherein $l$ is a longitudinal length of said construction and $D_P$ is a diameter of the propeller, said construction having an inner diameter which is between 60% and 150% of the diameter of the propeller, wherein said construction is longitudinally longer at the upper portion thereof than the lower portion, and is gradually reduced in length from its upper portion to its lower portion, any given longitudinal cross-section of said construction is wing-shaped with an inner substantially convex surface, and the outer surface of any given longitudinal cross-section is inclined to the center line of the hull by an angle inclined inward 10° toward said center line to an angle inclined outward 30° from said center line thereby increasing the width of the upper cross-sectional area from which water is drawn through said ring-shaped construction.

3. A ship comprising a main hull having a stern narrower at the bottom than at the top, a ring-shaped construction defining a continuous smooth-walled passage directly connected to the main hull on each side of the stern, the construction being directly connected at its upper portion and being connected through a support member at its lower portion, thereby guiding a wake to a propeller, said propeller being mounted rearward of said construction, with a space between the rear portion of said construction and said propeller blades, said construction being directly connected in such a manner that, at the point of direct connection, at least 20% of its minimum longitudinal length is fixed to the stern of said hull such that a portion of the hull extends within said passage, said construction being with a range of:

$$l = 0.2 \, D_P \text{ to } l = D_P$$

in which l is a longitudinal length of said construction and $D_P$ is a diameter of the propeller, said construction having an inner diameter which is between 60% and 150% of the diameter of the propeller, wherein said construction is longitudinally longer at the upper portion thereof than the lower portion, and any given longitudinal cross-section of said construction is wing-shaped with an inner, substantially convex surface thereby increasing the width of the upper cross-sectional area from which water is drawn through said ring-shaped construction.

4. A ship as claimed in claim 1 wherein said ring-shaped construction has a substantially circular transverse cross-section.

5. A ship as claimed in claim 1 wherein the ring-shaped construction has a substantially elliptical transverse cross-section.

6. A ship as claimed in claim 4 or 5 in which the transverse cross-section includes straight portions.

7. A ship as claimed in claim 1, 2 or 3 wherein the ring-shaped construction has a flat outer surface.

8. A ship as claimed in claim 1, 2 or 3 wherein the longitudinal cross-section of said construction has an outside face which is straight, and a substantial part of said inside face being composed of straight lines.

9. A ship as claimed in claims 1, 2 or 3 wherein the longitudinal cross-section of said construction has an outside face forming a straight line, and an inside face forming a projected curve, the rear end portion of said curve of the inside face having a diffuser angle parting from said inside face at the middle of the construction.

10. A ship comprising a main hull having a stern narrower at the bottom that at the top, a ring-shaped construction defining a continuous smooth-walled passage directly connected to the main hull on each side of the stern, thereby guiding a wake to a propeller, said propeller being mounted rearward to said construction, with a space between the rear portion of said construction and said propeller blades, said construction being directly connected in such a manner that, at the point of direct connection at least 20% of its minimum longitudinal length is fixed to the stern of said hull such that a portion of the hull extends within said passage, said construction being within a range of:

$$l = 0.2 \, D_P \text{ to } l = D_P$$

in which l is a longitudinal length of said construction and $D_P$ is a diameter of the propeller, said construction having an inner diameter which is between 60% and 150% of the diameter of the propeller, wherein said construction has integrally connected at its upper portion at least one stern fin extending longitudinally therefrom and a longitudinal cross-section of said construction is wing-shaped with an inner substantially convex surface, thereby increasing the width of the upper cross-sectional area from which water is drawn through said ring-shaped construction.

11. A ship as claimed in claim 10 wherein said stern fin extends backward.

12. A ship as claimed in claim 10 wherein said stern fin extends both forward and backward therefrom.

13. A ship as claimed in claim 10 wherein said stern fin extends forward.

* * * * *